(12) United States Patent
Kim

(10) Patent No.: US 11,749,954 B2
(45) Date of Patent: Sep. 5, 2023

(54) SEMICONDUCTOR USB DEVICE FOR DETECTING FOREIGN SUBSTANCES AND METHOD OF OPERATING THE SAME

(71) Applicant: Samsung Electronics Co., Ltd., Suwon-si (KR)

(72) Inventor: Je Kook Kim, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/518,752

(22) Filed: Nov. 4, 2021

(65) Prior Publication Data

US 2022/0059978 A1 Feb. 24, 2022

Related U.S. Application Data

(63) Continuation of application No. 16/901,378, filed on Jun. 15, 2020, now Pat. No. 11,196,221, which is a
(Continued)

(30) Foreign Application Priority Data

Aug. 31, 2016 (KR) ........................ 10-2016-0111658

(51) Int. Cl.
*H01R 13/66* (2006.01)
*G06F 13/42* (2006.01)
(Continued)

(52) U.S. Cl.
CPC ..... *H01R 13/6683* (2013.01); *G06F 13/4072* (2013.01); *G06F 13/4282* (2013.01);
(Continued)

(58) Field of Classification Search
CPC ............ H01R 13/6683; H01R 13/6675; H01R 13/703; H01R 29/00; H01R 24/60;
(Continued)

(56) References Cited

U.S. PATENT DOCUMENTS 8,154,422 B2 4/2012 Hsu et al.
9,088,906 B2 7/2015 Sella et al.
(Continued)

OTHER PUBLICATIONS

USB Type-C Cable and Connector Specification, Release 1.0; USB 3.0 Promoter Group; pp. 1-12,18-23 and 104-145; Aug. 11, 2014. (Year: 2014).*
(Continued)

*Primary Examiner* — Glenn A. Auve
(74) *Attorney, Agent, or Firm* — Harness, Dickey & Pierce, P.L.C.

(57) ABSTRACT

A semiconductor device for determining whether a foreign substance (e.g., water) is present and a method of operating the same are provided. The semiconductor device includes a receptacle including a plurality of pins according to a USB type-C receptacle interface; a first current source providing first current to a CC1 signal pin or a CC2 signal pin among the plurality of pins in a first operation mode; a second current source providing second current to the CC1 signal pin or the CC2 signal pin in a second operation mode; a third current source providing third current to at least two pins of other pins excluding the CC1 signal pin and the CC2 signal pin; and a power delivery integrated circuit (PDIC) controlling the first current source, the second current source and the third current source and detecting the voltage level of a signal outputted to the plurality of pins.

22 Claims, 9 Drawing Sheets

Related U.S. Application Data continuation of application No. 15/450,671, filed on Mar. 6, 2017, now Pat. No. 10,686,283.

(51) Int. Cl.

| | |
|---|---|
| *G06F 13/40* | (2006.01) |
| *H01R 13/703* | (2006.01) |
| *H01R 29/00* | (2006.01) |
| *H01R 24/60* | (2011.01) |
| *H01R 107/00* | (2006.01) |

(52) U.S. Cl.
CPC ....... *H01R 13/6675* (2013.01); *H01R 13/703* (2013.01); *H01R 29/00* (2013.01); *G06F 2213/0042* (2013.01); *H01R 24/60* (2013.01); *H01R 2107/00* (2013.01)

(58) Field of Classification Search
CPC ............. H01R 2107/00; G06F 13/4072; G06F 13/4282; G06F 2213/0042
See application file for complete search history.

(56) References Cited

U.S. PATENT DOCUMENTS

| | | | |
|---|---|---|---|
| 9,653,129 B2 | 5/2017 | Shen et al. | |
| 10,014,637 B2 | 7/2018 | Hasegawa et al. | |
| 10,114,781 B2 | 10/2018 | Whitby-Strevens et al. | |
| 10,686,283 B2 | 6/2020 | Kim | |
| 11,181,561 B2 * | 11/2021 | Lee | .................. G01R 19/16533 |
| 11,196,221 B2 * | 12/2021 | Kim | ..................... G06F 13/4282 |
| 2011/0104940 A1 | 5/2011 | Rabu et al. | |
| 2013/0096814 A1 | 4/2013 | Louis et al. | |
| 2013/0162632 A1 | 6/2013 | Varga et al. | |
| 2015/0286605 A1 | 10/2015 | Waters | |
| 2016/0004650 A1 | 1/2016 | Yamasaki et al. | |
| 2016/0092393 A1 | 3/2016 | Nge et al. | |
| 2016/0094071 A1 | 3/2016 | Nge et al. | |
| 2016/0117274 A1 | 4/2016 | Waters | |
| 2016/0157033 A1 | 6/2016 | Won et al. | |
| 2016/0342492 A1 | 11/2016 | Chen et al. | |
| 2017/0017598 A1 | 1/2017 | Chou et al. | |
| 2017/0139467 A1 | 5/2017 | Waters et al. | |
| 2017/0344098 A1 * | 11/2017 | Abu Hilal | ........... G06F 13/4022 |
| 2017/0344508 A1 | 11/2017 | Setiawan et al. | |
| 2017/0358922 A1 | 12/2017 | Bacon et al. | |
| 2018/0027330 A1 | 1/2018 | Rand et al. | |
| 2019/0011386 A1 * | 1/2019 | Park | ....................... G01M 3/181 |
| 2021/0407458 A1 * | 12/2021 | Shimuzu | ............. G06F 13/4077 |

OTHER PUBLICATIONS

Sadat, Anwar, "Low-cost implementation of USB Type-CTM," System Manager High Speed Interface, Texas Instruments, Jul. 2015, pp. 1-8.

Sadat, Anwar, et al., "USB Type-CTM represents breackthrough connectivity," Systems Manager, High Speed Interface, Texas Instruments, Dec. 2015, pp. 1-8.

"USB Power Delivery and Type-C," APEC 2016, Long Beach Convention Center, Mar. 20-24, 2016, pp. 1-34.

* cited by examiner

| A1 | A2 | A3 | A4 | A5 | A6 | A7 | A8 | A9 | A10 | A11 | A12 |
|---|---|---|---|---|---|---|---|---|---|---|---|
| GND | TX1+ | TX1− | $V_{BUS}$ | CC1 | D+ | D− | SBU1 | $V_{BUS}$ | RX2− | RX2+ | GND |
| GND | RX1+ | RX1− | $V_{BUS}$ | SBU2 | D− | D+ | CC2 | $V_{BUS}$ | TX2− | TX2+ | GND |
| B12 | B11 | B10 | B9 | B8 | B7 | B6 | B5 | B4 | B3 | B2 | B1 |

SEMICONDUCTOR USB DEVICE FOR DETECTING FOREIGN SUBSTANCES AND METHOD OF OPERATING THE SAME

This application is a continuation of U.S. non-provisional application Ser. No. 16/901,378, filed on Jun. 15, 2020, which is a continuation of U.S. non-provisional application Ser. No. 15/450,671, filed on Mar. 6, 2017, which claims the benefit of priority under 35 U.S.C. § 119 to Korean Patent Application No. 10-2016-0111658, filed on Aug. 31, 2016 in the Korean Intellectual Property Office (KIPO), the entire disclosure of each of which is incorporated herein by reference in their entireties.

BACKGROUND

1. Field

Various example embodiments herein relate to a semiconductor device and/or a method of operating the same.

2. Description

USB (Universal Serial Bus) devices have been miniaturized and slimmed, and have been advanced in accordance with a tendency or desire for a small, light-weight form-factor. Typically, USB type-C® devices are defined as receptacles, plugs and cables, which can meet the above tendency.

A USB type-C® receptacle interface provides pull-up current to specific pins (for example, the CC1 signal pin and the CC2 signal pin) installed in the receptacle, and then observes whether a pull-down phenomenon occurs in the desired pins in order to determine whether another USB device is connected to the receptacle. Therefore, even when another USB device is not connected to the receptacle, pull-up current may be provided to the specific pins.

If foreign matter, particularly water, is applied to and/or present in the receptacle, the pull-up current flows to a GND signal pin and there is a danger of corrosion of the pins installed in the receptacle. Therefore, before providing bus power $V_{BUS}$ to the USB receptacle, it is desirable to determine whether or not water is applied to and/or present in the receptacle in order to avoid corroding and/or damaging the pins of the receptacle.

SUMMARY

An aspect of at least one example embodiment provides a semiconductor device which can determine whether or not water is applied to and/or present in a receptacle before providing bus power $V_{BUS}$ to the receptacle.

Another aspect of some example embodiments provide a method of operating a semiconductor device which can determine whether or not water is applied to and/or present in a receptacle before providing bus power $V_{BUS}$ to the receptacle.

According to at least one example embodiment of the present disclosure, there is provided a semiconductor device including a receptacle based on a USB type-C® receptacle interface, the receptacle including a plurality of pins, a first current source configured to provide a first current to a CC1 signal pin or a CC2 signal pin among the plurality of pins in a first operation mode, a second current source configured to provide a second current to the CC1 signal pin or the CC2 signal pin in a second operation mode, the second current being smaller than the first current, a third current source configured to provide a third current to at least two pins of the plurality of pins excluding the CC1 signal pin and the CC2 signal pin, in the second operation mode, and a power delivery integrated circuit (PDIC) configured to control the first current source, the second current source, and the third current source, and detect a voltage level of a signal outputted to one or more pins of the plurality of pins.

According to at least one example embodiment of the present disclosure, there is provided a semiconductor device including a receptacle based on a USB type-C® receptacle interface, the receptacle including a plurality of pins, a power delivery integrated circuit (PDIC) configured to pull up a CC1 signal pin or a CC2 signal pin of the plurality of pins, detect a voltage level of the CC1 signal pin or the CC2 signal pin to determine whether a USB device is connected to the receptacle based on current pull up of other pins of the plurality of pins, excluding the CC1 signal pin and the CC2 signal pin, detect a voltage level of at least two pins of the other pins, and determine whether water is present in the receptacle based on the detected voltage level.

According to at least one example embodiment of the present disclosure, there is provided a method of operating a semiconductor device including providing a first current to a CC1 signal pin or a CC2 signal pin among a plurality of pins in a receptacle according to a USB type-C® receptacle interface in a first operation mode, providing a second current to the CC1 signal pin or the CC2 signal pin in a second operation mode, the second current being smaller than the first current, providing a third current to at least two pins of the plurality of pins excluding the CC1 signal pin and the CC2 signal pin in the second operation mode, and detecting a voltage level of a signal outputted to the plurality of pins to detect water in the receptacle.

According to at least one example embodiment of the present disclosure, there is provided a semiconductor device to detect foreign substances in a receptacle, the device including a receptacle including a plurality of pins, the plurality of pins including at least one configuration channel signal pin, at least one bus power signal pin, at least one ground signal pin, and at least one other signal pin, at least one current source configured to supply a first current or a second current to the at least one configuration channel signal pin, and a power delivery integrated circuit (PDIC) configured to operate in a first operating mode or a second operating mode, the first operating mode including controlling the at least one current source to supply the first current to the at least one configuration channel signal pin, and the second operating mode including controlling the at least one current source to supply the second current to the at least one configuration channel signal pin, detect a voltage level of the at least one configuration channel signal pin, and determine whether a foreign substance is present in the receptacle based on the detected voltage level.

These and other aspects of the example embodiments herein will be better appreciated and understood when considered in conjunction with the following description and the accompanying drawings.

BRIEF DESCRIPTION OF THE DRAWINGS

The foregoing and other features of inventive concepts will be apparent from the more particular description of non-limiting example embodiments of inventive concepts, as illustrated in the accompanying drawings in which like reference characters refer to like parts throughout the different views. The drawings are not necessarily to scale, emphasis instead being placed upon illustrating principles of inventive concepts. In the drawings.

DETAILED DESCRIPTION

The various example embodiments herein and the various features and advantageous details thereof are explained more fully with reference to the non-limiting example embodiments that are illustrated in the accompanying drawings and detailed in the following description. Descriptions of well-known components and processing techniques are omitted so as to not unnecessarily obscure the example embodiments herein. The examples used herein are intended merely to facilitate an understanding of ways in which the example embodiments herein may be practiced and to further enable those of skill in the art to practice the example embodiments herein. Accordingly, the examples should not be construed as limiting the scope of the example embodiments herein.

Figures 1, 2:
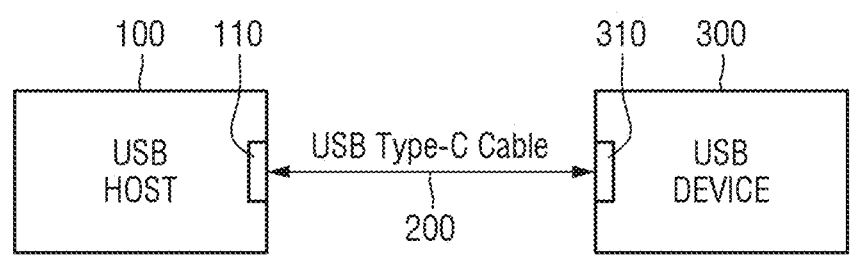
FIG. 1 is a block diagram illustrating a semiconductor system according to at least one example embodiment.
FIG. 2 is a schematic view illustrating a USB type-C® receptacle interface according to at least one example embodiment.

FIG. 1 is a block diagram illustrating a semiconductor system according to at least one example embodiment of the present disclosure.

Referring to FIG. 1, the semiconductor system according to at least one example embodiment of the present disclosure may include a USB host 100, a USB device 200, and a USB cable 200 electrically connecting the USB host 100 and the USB device 300, but is not limited thereto and may include a greater or lesser number of constituent elements. While the figures and example embodiments of the present disclosure are described with reference to the USB data communication protocol for the sake of clarity, the example embodiments are not limited thereto and may be applied to other wired data communication protocols and interfaces.

The USB host 100 is a host computer system mounted with a USB host controller. Meanwhile, the USB device 300 may include an auxiliary device and/or a hub in accordance with (e.g., compatible with) USB standards. The USB host 100 and the USB device 300 may include receptacle interfaces 110 and 310 according to a USB interface, respectively. The receptacle interfaces 110 and 310 may be electrically connected with each other using the USB cable 200.

In some example embodiments, the USB host 100 may provide a USB type-C® interface, but the example embodiments are not limited thereto and may be based on other interface standards, including other USB interface types. That is, the receptacle interface 110 of the USB host 100 may be a USB type-C® receptacle interface, and the USB cable 200 electrically connecting the USB host 100 and the USB device 300 may be a USB type-C® cable.

Such a USB type-C® interface may be embodied base on the definition of USB 2.0 protocol, USB 3.1 protocol, etc.

FIG. 2 is a schematic view illustrating a USB type-C® receptacle interface according to at least one example embodiment of the present disclosure.

Referring to FIG. 2, the USB type-C® receptacle interface may be upside-up or upside-down. In other words, USB type-C® receptacles may be reversible and may be plugged into a receptacle interface in a first orientation or a second orientation without issue. The USB type-C® receptacle interface of the USB host 100 may be the same as that of the USB device 300, but is not limited thereto.

The receptacle interface, such as a USB type-C® receptacle interface, includes a plurality of pins (e.g., A1 to A12 and B1 to B12).

Specifically, at least one pin (e.g., A1, A12, B1, and B2) corresponds to a ground signal, such as GND signal pins, and at least one pin (e.g., A4, A9, B4, and B9) corresponds to a power signal, such as USB cable bus power ($V_{BUS}$) signal pins. According to at least one example embodiment, these pins provide power signals and ground voltage signals, but the example embodiments are not limited thereto.

Meanwhile, at least one pin (e.g., the A2, A3, B11, and B10) corresponds to transmission signal pins, such as TX1+ signal pin, a TX1− signal pin, and receiver pins, such as an RX1+ signal pin, and an RX1− signal pin, respectively, and at least one pin (e.g., B2, B3, A11, and A10) corresponds to at least one second transmission pin and at least one second receiver pin, a TX2+ signal pin, a TX2− signal pin, an RX2+ signal pin, and an RX2− signal pin, respectively, etc. According to at least one example embodiment, these pins provide a data transmission path according to the USB 3.1 standard, but the example embodiments are not limited thereto.

Meanwhile, at least one pin (e.g., A6 and A7) corresponds to a signal pin, such as the D+ signal pin and a D− signal pin, and at least one pin (e.g., B6 and B7) correspond to additional signal pins, such as another D+ signal pin and another D− signal pin. According to at least one example embodiment, hese pins provide a data transmission path(s) according to the USB 2.0 standard, but the example embodiments are not limited thereto.

Meanwhile, at least one pin (e.g., A8 and B8) corresponds to a sideband signal, such as SBU1 signal pin and a SBU2 signal pin. According to at least one example embodiment, these pins correspond to pins for sideband, but the example embodiments are not limited thereto.

Meanwhile, at least one pin (e.g., A5 and B5) corresponds to connection signals, such as a CC1 signal pin and a CC2 signal pin. According to at least one example embodiment, these pins correspond to pins detecting the connection of the USB device 300 and setting an interface using the USB type-C® cable 200 and a connector, but the example embodiments are not limited thereto.

It is obvious to those skilled in the art that such a receptacle interface is only an example of USB type-C® receptacle interfaces and may be modified depending on the detailed implementation purpose, such as modifying the receptacle interface to conform to other wired data communication standards.

Figure 3:
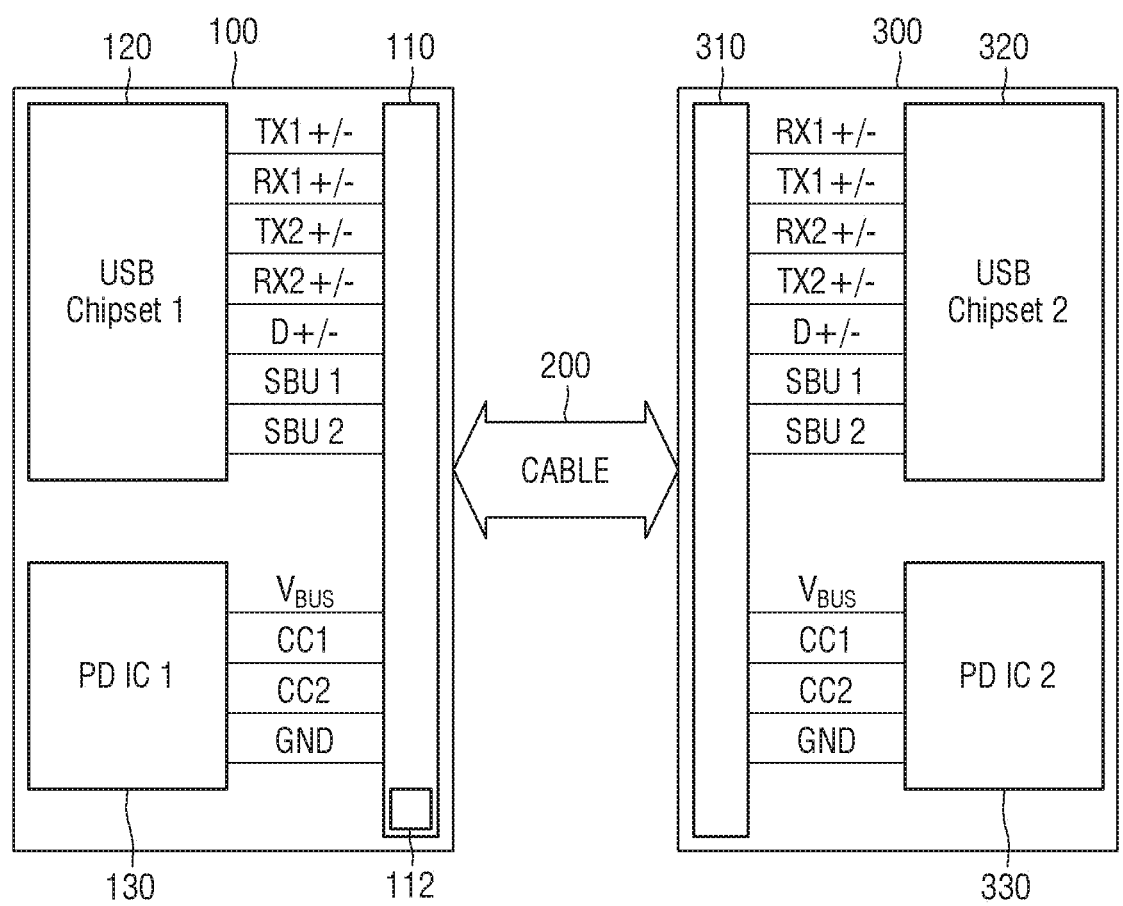
FIG. 3 is a block diagram illustrating a semiconductor device according to at least one example embodiment.

FIG. 3 is a block diagram illustrating a semiconductor device according to at least one example embodiment of the present disclosure.

Referring to FIG. 3, the semiconductor device according to at least one example embodiment of the present disclosure may be the USB host 100. The USB host 100 may include a receptacle interface 110, a USB chipset 120, and a power delivery integrated circuit (PDIC) 130, etc., but is not limited thereto and may include a greater or lesser number of constituent components.

Similarly, the USB device 300 may include a receptacle interface 310, a USB chipset 320, and a PDIC 330, etc., but is not limited thereto and may include a greater or lesser number of constituent components. The USB host and the USB device 300 may transmit and receive data through the cable 200 using their respective receptacle interfaces 110 and 310.

Each of the receptacle interfaces 110 and 310, as described with reference to FIG. 2, may include a plurality of pins for embodying an interface. In some example embodiments, the receptacle interface 110 may further include an MID(RID) pin 112, etc., in addition to the pins having been described with reference to FIG. 2.

The USB chipset 120 may input and output signals along a plurality of pins, e.g., TX1+/− signals, RX1+/− signals, TX2+/− signals, RX2+/− signals, D+/− signals, SBU1 signals, and SBU2 signals, etc., and may transmit and receive these signals to/from the USB chipset 320. Similarly, the USB chipset 320 may input and output signals along a plurality of pins, e.g., RX1+/− signals, TX1+/− signals, RX2+/− signals, TX2+/− signals, D+/− signals, SBU1 signals, and SBU2 signals, etc., and may transmit and receive these signals to/from the USB chipset 120.

The PDIC 130 may input and output signals along a plurality of pins, e.g., a USB cable bus power ($V_{BUS}$) signal, a CC1 signal, a CC2 signal, and a GND signal, etc., and may transmit and receive these signals to/from the PDIC 330. Similarly, the PDIC 330 may input and output signals along a plurality of pins, e.g., a USB cable bus power ($V_{BUS}$) signal, a CC1 signal, a CC2 signal, and a GND signal, and may transmit and receive these signals to/from the PDIC 130.

Here, the CC1 signal and the CC2 signal, which are configuration channel signals, may detect whether or not the USB host 100 and the USB device 300 are connected to each other.

For this purpose, the USB type-C® receptacle interface provides a pull-up current to the CC1 signal pin and the CC2 signal pin installed in the receptacle interface 110, and then observes whether a pull-down phenomenon occurs in the CC1 signal pin or the CC2 signal pin in order to determine whether the USB device 300 is connected to the USB host 100.

Specifically, before the USB host 100 and the USB device 300 are connected with each other through the cable 200, a pull-up current is provided to the CC1 signal pin of the USB host 100, and the CC1 signal pin of the USB device 300 is connected to GND through pull-down resistance Rd. Therefore, when the USB host 100 and the USB device 300 are connected to each other through the cable 200, the pull-up current provided to the CC1 signal pin of the USB host 100 is transmitted to the CC1 signal pin of the USB device 300, and the pull up current flows to GND through the pull-down resistance Rd connected to the CC1 signal pin of the USB device 300. That is, the USB type-C® receptacle interface may determine whether or not the USB host 100 and the USB device 300 are connected to each other through the cable 200 by observing the change in voltage level of the CC1 signal pin and CC2 signal pin installed in the receptacle interface 110.

However, if the USB device 300 is not connected to the receptacle interface 110 of the USB host 100 and foreign matter, particularly water, is applied to and/or present in the receptacle interface 110, the pull-up current provided to the CC1 signal pin of the USB host 100 may pull down through the GND signal pin of the USB host 100 due to the applied foreign matter (e.g., water, dirt, oil, non-compatible and/or improper cable/interface, other foreign substances, etc.). Therefore, by only observing the change in voltage level of the CC1 signal pin and CC2 signal pin installed in the receptacle interface 110, it is difficult to determine whether the pull down of the pull-up current is caused by the connection of the USB device 300 or caused by the application of the foreign matter, such as water.

Accordingly, in various example embodiments of the present disclosure, the application situation of foreign matter, such as water, etc., is determined by providing a pull-up current to other pins, excluding the CC1 signal pin and the CC2 signal pin, among the plurality of pins installed in the receptacle interface 110 of the USB host 100 and observing the change in the voltage levels of the other pins.

Figure 4:
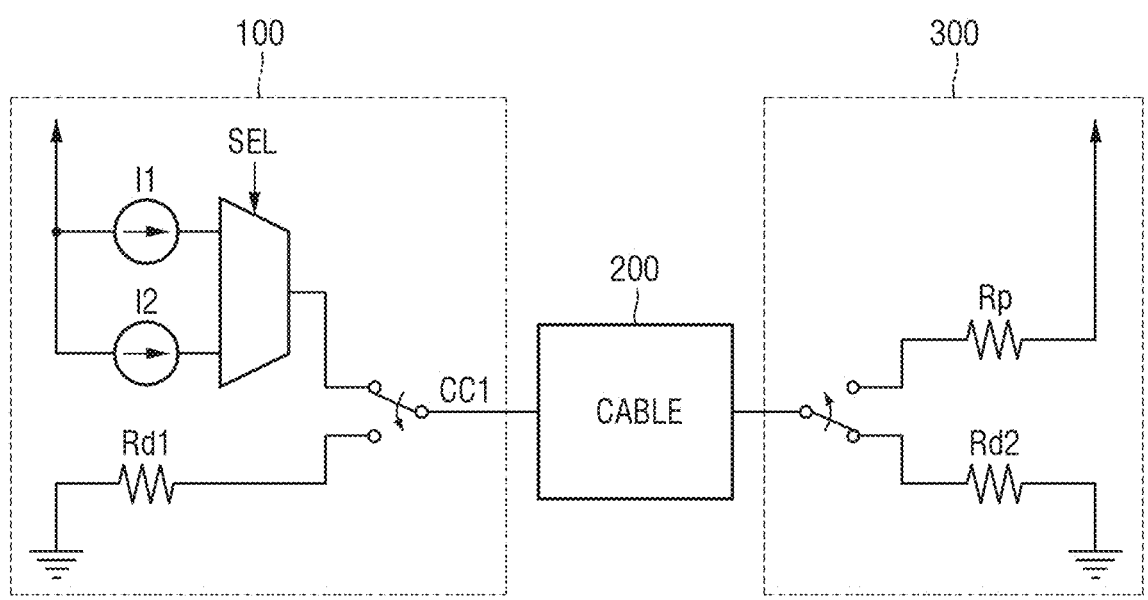
FIG. 4 is a block diagram illustrating a semiconductor device according to at least one example embodiment.

FIG. 4 is a block diagram illustrating a semiconductor device according to at least one example embodiment of the present disclosure.

Referring to FIG. 4, the semiconductor device 100 according to at least one example embodiment of the present disclosure includes a first current source I1 and a second current source I2, but is not limited thereto.

When the semiconductor device 100 operates in a first operation mode, the first current source I1 provides first current to the CC1 signal pin or the CC2 signal pin, and when the semiconductor device 100 operates in a second operation mode, the second current source I2 provides second current to the CC1 signal pin or the CC2 signal pin according to at least one example embodiment.

Here, the first operation mode refers to a normal mode in which a DFP (Downstream Facing Port), a UFP (Upstream Facing Port), and a DRP (Dual-Role Port) according to the USB type-C® specification, but not limited thereto, are performed without determining whether water, or other foreign substances, is applied to and/or present in the receptacle interface 110. Meanwhile, the second operation mode refers to a protection mode in which whether water or other foreign substance is applied to and/or present in the receptacle interface 110 is determined before performing DFP, UFP, and DRP according to the connection type specification (e.g., USB type-C® specification). According to at least one example embodiment, when the semiconductor device 100 is in the protection mode, clearly determines whether water and/or other foreign substance has been applied to the receptacle interface 110, and the results indicate that water has not been applied thereto, the semiconductor device 100 starts to operate in the normal mode.

The semiconductor device 100 may further include a multiplexer MUX receiving the output of the first current source I1 and the output of the second current source I2, selecting the output of the first current source I1 in the first operation mode and selecting the output of the second current source I2 in the second operation mode based on a selection signal or control signal. According to at least one example embodiment, the multiplexer MUX may perform the above operations according to a selection signal SEL.

In some example embodiments, the semiconductor device 100 may be designed such that the amount of the first current is smaller than the amount of the second current.

For example, the first current source I1 may be designed to output a first current of 80 uA±20%, 180 uA±8% and 330 uA±8%, etc., according to the requirements of the USB type-C® specification, but is not limited thereto. The second current source I2 may be designed to output a second current of more than 0 uA and less than 80 uA±20%, but is not limited thereto.

In some example embodiments, in order to further reduce and/or prevent the corrosion of the plurality of pins installed in the receptacle interface 110, the second current source I2 may be designed to output a second current of about 1 uA, but the scope of the present disclosure is not limited thereto.

In at least one example embodiment, the PDIC 130 controls the second current source I2 to provide a second current to the CC1 signal pin to pull up the second current, and the PDIC 130 detects the voltage level of the signal outputted to the CC1 signal pin, thereby determining whether the USB device 300 is connected to the receptacle interface 110 of the USB host 100 through the cable 200. For example, the PDIC 130 may determine that the USB device 300 is connected to the receptacle interface 110 of the USB host 100 through the cable 200 when the voltage level of the signal outputted to the CC1 signal pin transitions from a first desired voltage level H to a second desired voltage level L.

The reason for this is that, when the USB host 100 and the USB device are connected through the cable 200, the second current provided to the CC1 signal pin of the USB host 100 is transferred to the CC1 signal pin of the USB device 200 and flows to GND through the pull-down resistance Rd2 connected to the CC1 signal pin of the USB device 300.

Then, the PDIC 130 controls the first current source I1 to provide the first current to the CC1 signal pin and the CC2 signal pin and detects the voltage level of the signal outputted to the CC1 signal pin and the CC2 signal pin, thereby determining whether a USB device 300, such as a charger, etc., is connected to the receptacle interface 110.

Figure 5:
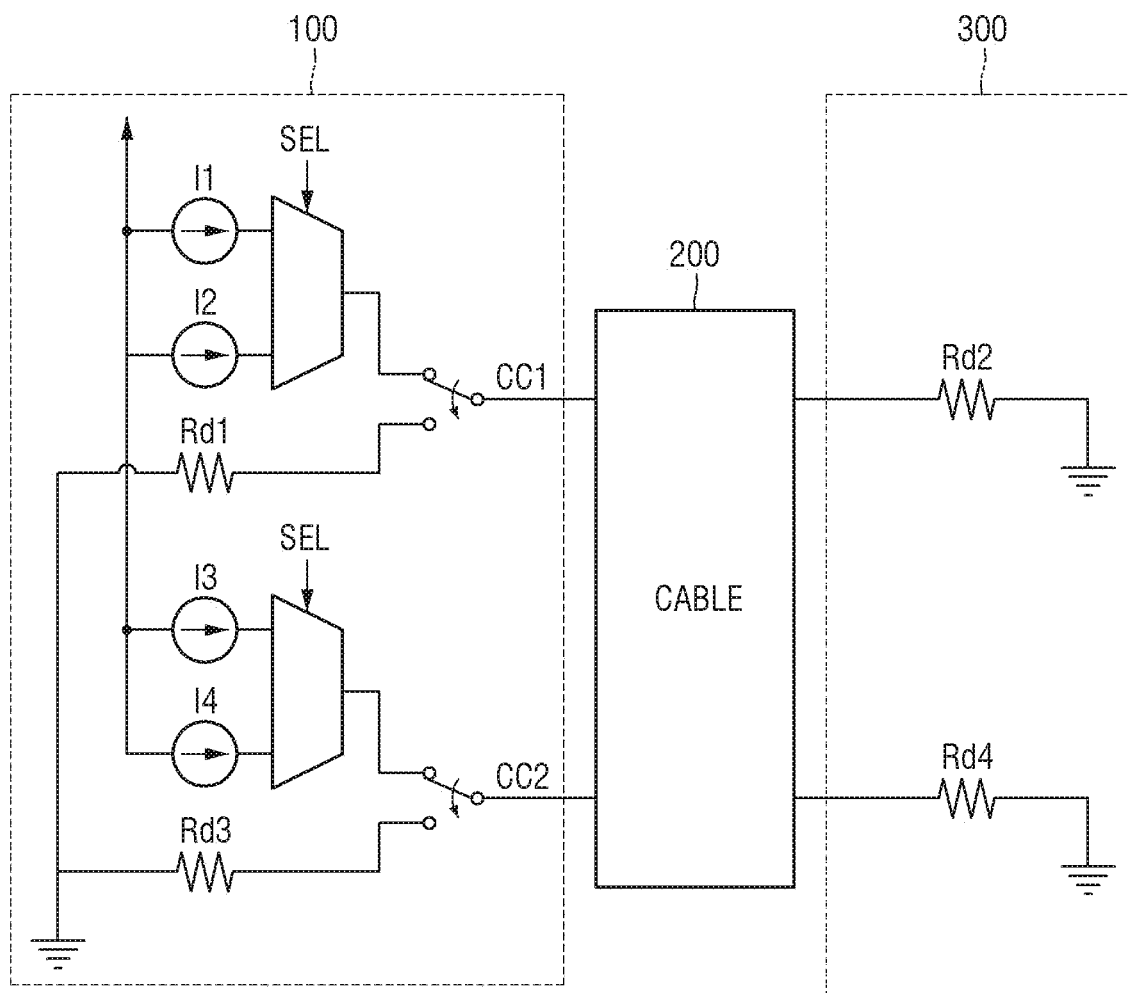
FIGS. 5 and 6 are block diagrams illustrating a semiconductor device according to at least one example embodiment.
Figure 6:
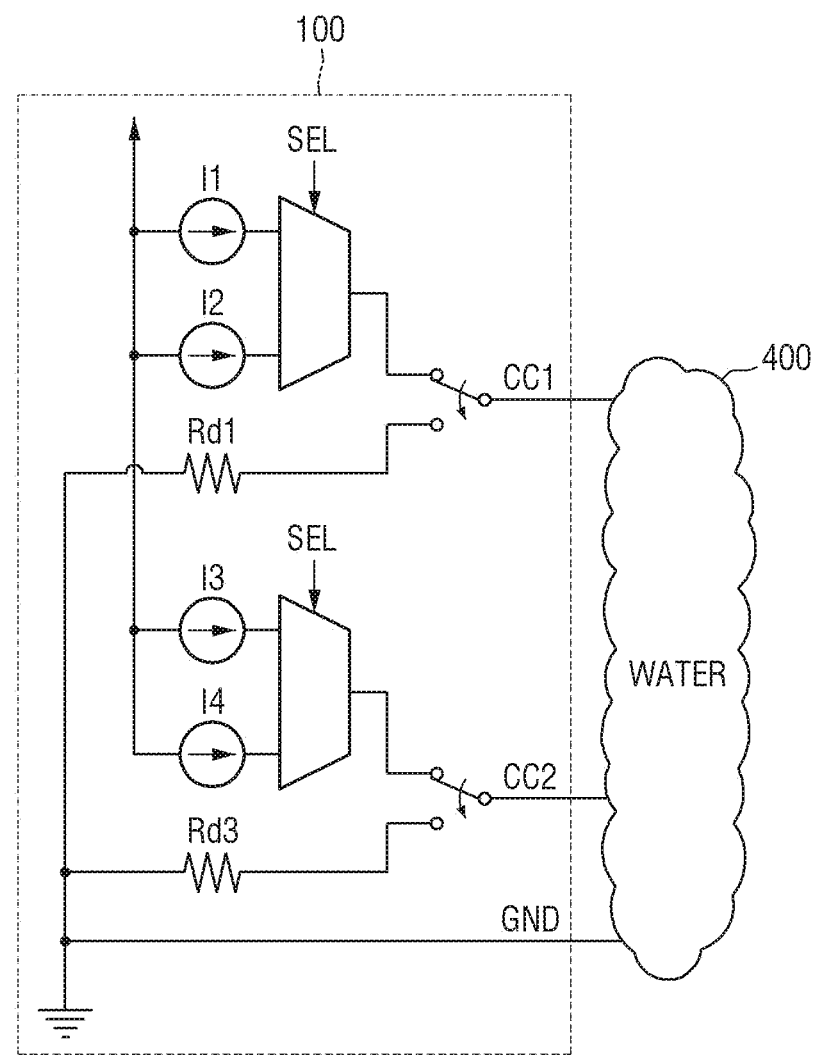

FIGS. 5 and 6 are block diagrams illustrating a semiconductor device according to at least one example embodiment of the present disclosure.

Referring to FIG. 5, the semiconductor device 100 according to at least one example embodiment of the present disclosure includes current sources I1 and I2 for providing current to the CC1 signal pin, and current sources I3 and I4 for providing current to the CC2 signal pin, but is not limited thereto.

As described with reference to FIG. 4, when the semiconductor device 100 operates in a first operation mode, the current sources I1 and I3 provide first current to the CC1 signal pin and the CC2 signal pin, respectively, and when the semiconductor device 100 operates in a second operation mode, the current sources I2 and I4 provide second current to the CC1 signal pin and the CC2 signal pin, respectively.

In some example embodiments, the semiconductor device 100 may be designed such that the amount of the first current is smaller than the amount of the second current.

For example, the current sources I1 and I3 may be designed to output a current of 80 uA±20%, 180 uA±8% and 330 uA±8%, etc., according to the requirements of the USB type-C® specification, but is not limited thereto. The current sources I2 and I4 may be designed to output a current of more than 0 uA and less than 80 uA±20%, but is not limited thereto.

In some example embodiments, in order to further reduce and/or prevent the corrosion of the plurality of pins installed in the receptacle interface 110, the current sources I2 and I4 may be designed to output a second current of about 1 uA, but the example embodiments are not limited thereto.

In at least one example embodiment, the PDIC 130 controls the current sources I2 and 14 to provide second current to the CC1 signal pin and the CC2 signal pin to pull up the second current, and the PDIC 130 detects the voltage level of the signal outputted to the CC1 signal pin and the CC2 signal pin, thereby determining whether the USB device 300 is connected to the receptacle interface 110 of the USB host 100 through the cable 200. For example, the PDIC 130 may determine that the USB device 300 is connected to the receptacle interface 110 of the USB host 100 through the cable 200 when the voltage level of the signal outputted to the CC1 signal pin or the CC2 signal pin transitions from a first voltage desired level H to a second voltage desired level L.

As described above, the reason that the voltage level of the signal outputted to the CC1 signal pin or the CC2 signal pin transitions from the first desired voltage level H to the second desired voltage level L, as shown in FIG. 6, is because there is an electrical path which allows the current provided to the CC1 signal pin of the USB host 100 by the application of water 400 and/or other foreign substance to the receptacle interface 110 of the USB host 100 such that it pulls down the current through the GND signal pin in addition to the above electrical path through the pull-down resistances Rd2 and Rd4 of the USB device 300, as shown in FIG. 5. Therefore, it is desired and/or required to distinguish between these two paths.

Figure 7:
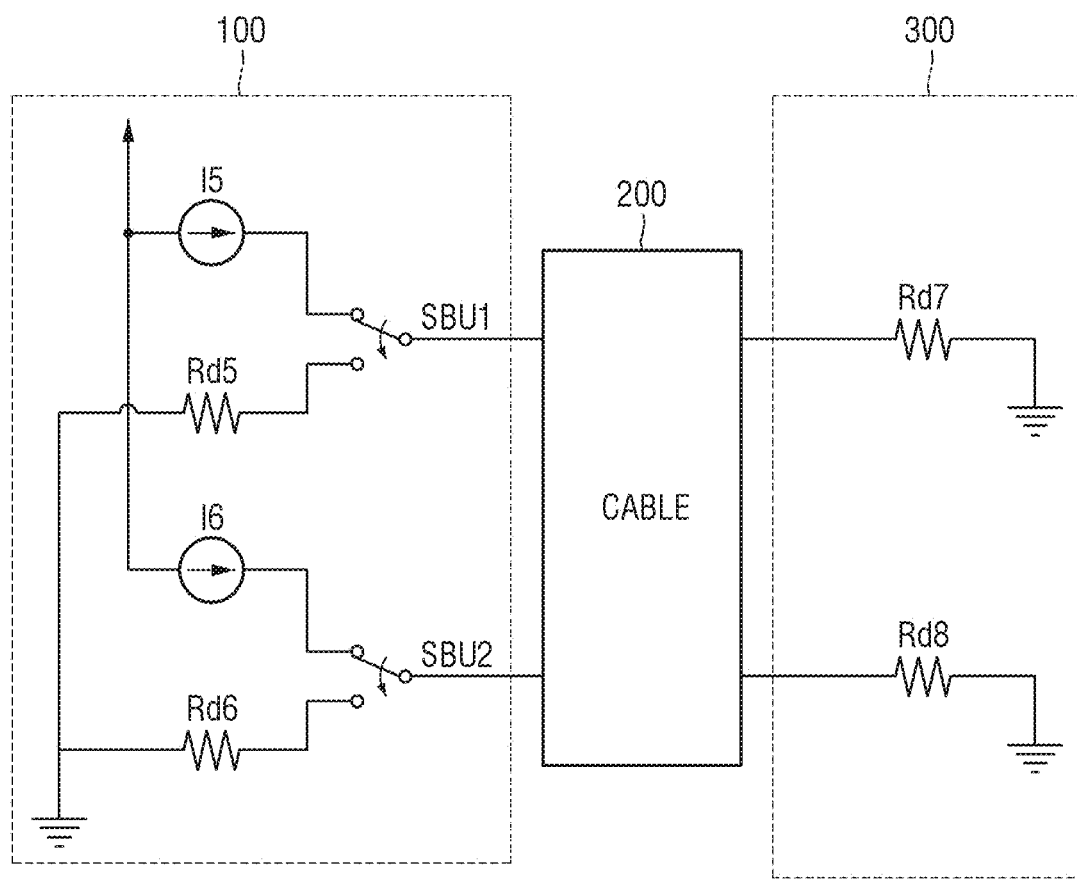
FIGS. 7 and 8 are block diagrams illustrating a semiconductor device according to at least one example embodiment.
Figure 8:
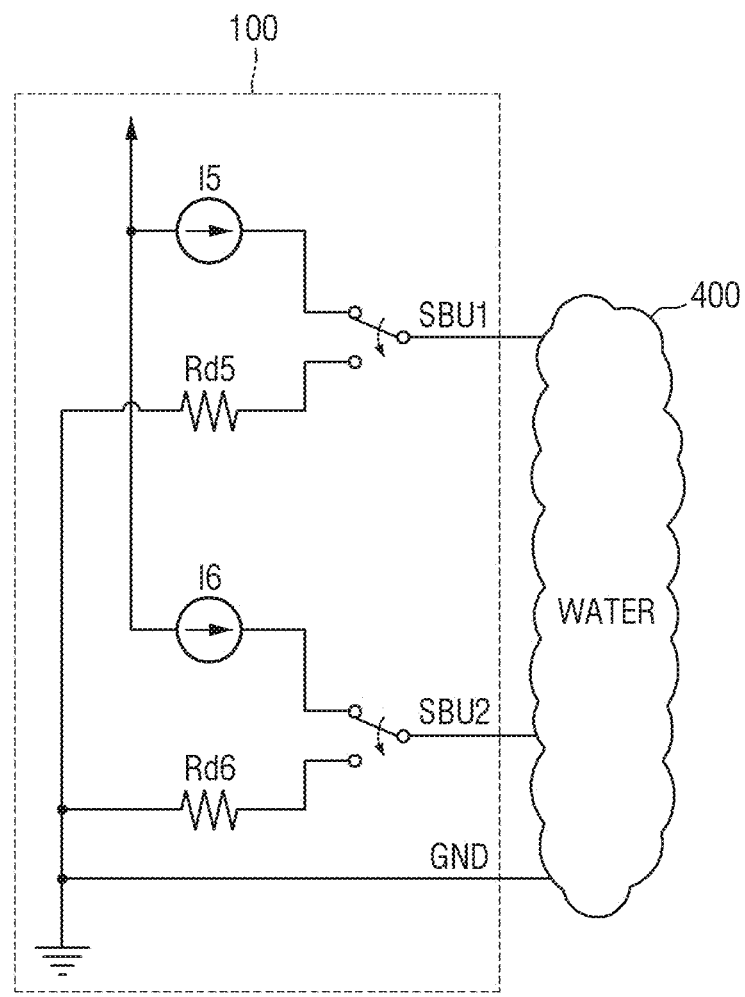

FIGS. 7 and 8 are block diagrams illustrating a semiconductor device according to at least one example embodiment of the present disclosure.

Referring to FIG. 7, the semiconductor device 100 according to at least one example embodiment of the present disclosure further includes third current sources I5 and I6.

The third current sources I5 and 16 provide third current to at least two pins of the plurality of pins installed in the receptacle interface of the USB host 100, excluding the CC1 signal pin and the CC2 signal pin, in the second operation mode, but is not limited thereto.

In at least one example embodiment, for the convenience of explanation, the at least two pins are shown and described as a SBU1 signal pin and a SBU2 signal pin. However, this is only an example of various example embodiments and the example embodiments are not limited thereto. That is, the at least two pins may be at least two selected from the plurality of signal pins, besides the CC1 signal pin and the CC2 signal pin, a TX1+ signal pin, a TX1− signal pin, an RX1+ signal pin, an RX1− signal pin, a TX2+ signal pin, a TX2− signal pin, an RX2+ signal pin, an RX2− signal pin, a D+ signal pin, a D− signal pin, an SBU1 signal pin, an SBU2 signal pin, and an MID(RID) pin 112, etc.

In some example embodiments, the third current sources I5 and I6 may be designed to output a third current of about 1 uA, but the scope of the present disclosure is not limited thereto and the current may be any desired amount.

In at least one example embodiment, the PDIC 130 controls the third current sources I5 and I6 to provide third current to the at least two pins of pins other than the CC1 signal pin and the CC2 signal pin, for example, the SBU1 signal pin and the SBU2 signal pin, to pull up the third current, and the PDIC 130 detects the voltage level of the signal outputted to the, for example, SBU1 signal pin and the SBU2 signal, thereby determining whether water 400 and/or other foreign substance is applied to the receptacle interface 110 of the USB host 100.

For example, the PDIC 130 may determine that water 400 and/or other foreign substance is detected in or on the receptacle interface 110 of the USB host 100 because the current provided to the SBU1 signal pin and SUB2 signal pin of the USB host 100 pulls down through the GND signal pin, instead of through the pull-down resistances Rd7 and Rd8 of the USB device 300, due to the application of water 400 to the receptacle interface 110 of the USB host 100, as shown in FIG. 8, when the voltage level of the signal outputted to the SBU1 signal pin and the SBU2 signal pin transitions from a first voltage level H to a second voltage level L.

When the PDIC 130 determines that water 400 and/or other foreign substance is detected in or on the receptacle interface 110 of the USB host 100, the PDIC 130 may delay the supply of bus power $V_{BUS}$ and, continuously or periodically, repeat the detection of water 400 until the water 400 and/or other foreign substance is no longer detected.

Figure 9:
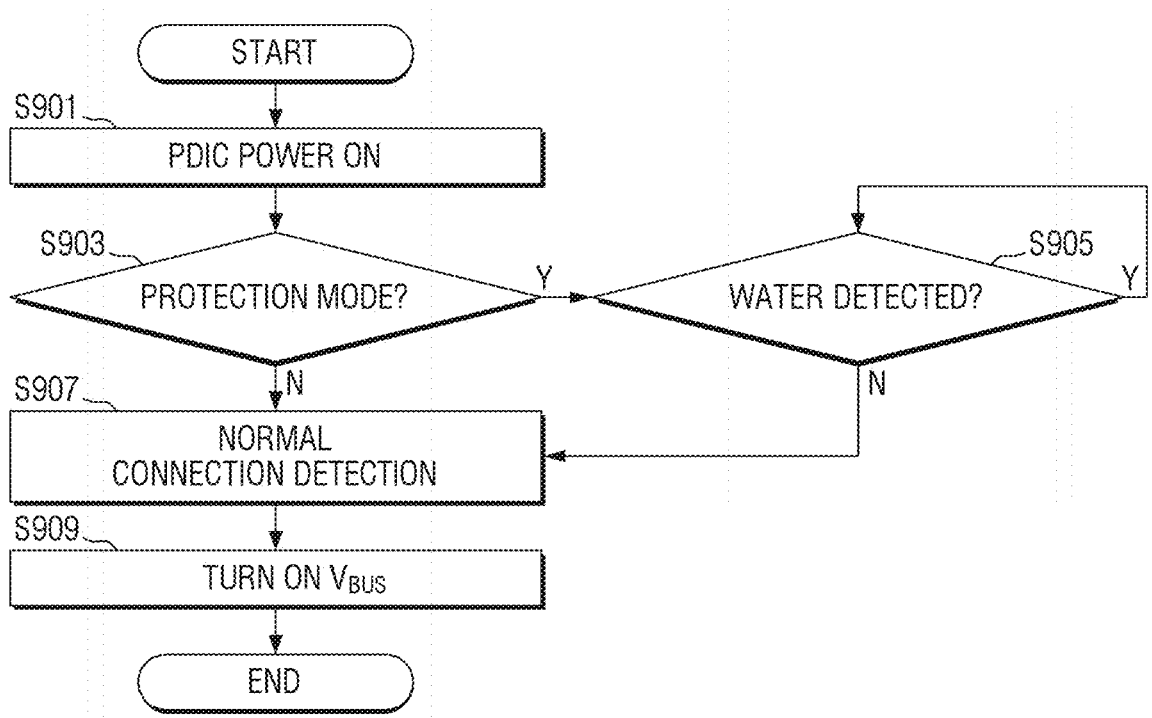
FIGS. 9 and 10 are flowcharts illustrating a method of operating a semiconductor device according to at least one example embodiment.
Figure 10:
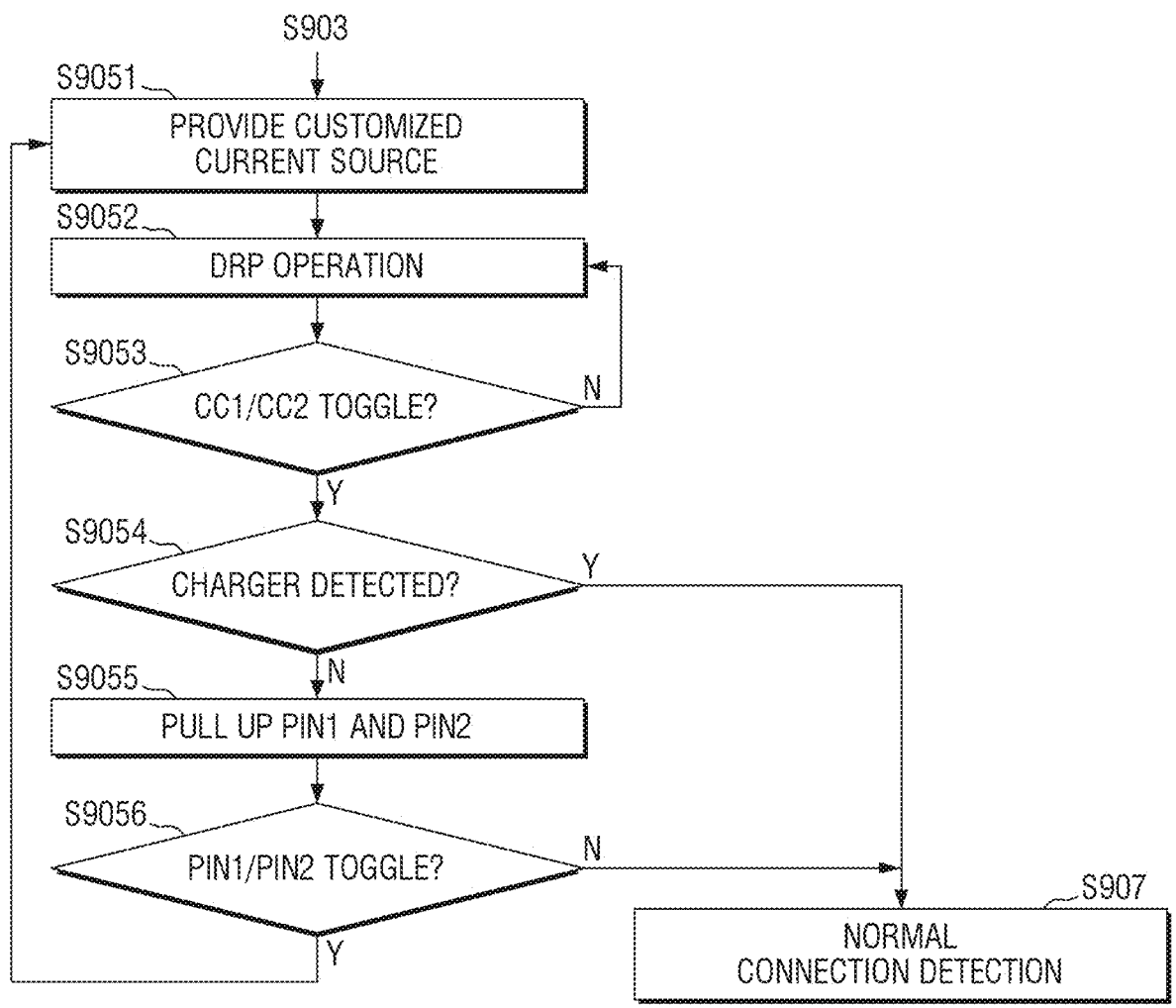

FIGS. 9 and 10 are flowcharts illustrating a method of operating a semiconductor device according to at least one example embodiment of the present disclosure.

Referring to FIG. 9, in the method of operating a semiconductor device according to at least one example embodiment of the present disclosure, the PDIC 130 is powered on in S901, and then in S903, it is determined whether the semiconductor device is to operate in a protection mode (e.g., the second operation mode) or in a normal mode (e.g., the first operation mode). As described above, in the protection mode, before DFP, UFP, and DRP according to, for example, the USB type-C® specification, are performed, the semiconductor device determines whether water and/or other foreign substance has been and/or is applied to the receptacle interface 110 in S905.

When the semiconductor device is determined to be in protection mode, the semiconductor device then determines whether or not water and/or other foreign substance has been and/or is applied to the receptacle interface 110 of the USB host 100 (S905). If water is applied to the receptacle interface 110, S905 may be continuously or periodically repeated, and if water is not applied to the receptacle interface 110, the method proceeds to S907.

When the semiconductor device is determined to be in the normal mode (e.g., not operating in the protection mode) following S903, or water and/or other foreign substance was not detected in S905, the semiconductor device proceeds in a normal mode so that, for example, DFP, UFP, and DRP according to the USB type-C® specification are performed, and the detection of the USB device 300 is performed (S907).

In S907, DFP, UFP, and DRP according to, for example, the USB type-C® specification, are performed using the first current in the normal mode, so as to determine whether or not the USB device 300 is connected. In S909, a USB cable bus power $V_{BUS}$ starts to supply power to the connected USB device 300.

Referring to FIG. 10, S905 of FIG. 9 may further include S9051 to S9056 according to at least one example embodiment.

First, in S9051, the aforementioned second current, e.g., a customized current source, is provided to the CC1 signal pin and CC2 signal pin of the USB host 100. The second current may be a current of a desired amount, such as 1 uA.

In S9052, DRP is performed with current pulled up to the second current.

In S9053, a change in voltage level of the CC1 signal pin and/or the CC2 signal pin is detected based on the pulled up second current. For example, when the signal outputted to the CC1 signal pin or the CC2 signal pin transitions from a first voltage level H to a second voltage level L, it may be determined that the USB device 300 is connected with the USB host 100 through the cable 200.

However, if due to the application of water 400 and/or other foreign substance to the receptacle interface 110, a change in voltage level of the CC1 signal pin and/or the CC2 signal pin is not detected based on the pulled up second current, it may be determined that the current provided to the CC1 signal pin of the USB host 100 was pulled down through the GND signal pin of the USB host 100.

In S9054, the first current is provided to the CC1 signal pin and/or the CC2 signal pin, and the voltage level of the signal outputted to the CC1 signal pin and the CC2 signal pin is detected so as to determine whether a charger and/or other USB device is connected to the receptacle interface 110. If the charger and/or other USB device is connected to the receptacle interface 110, S907 of FIG. 9 proceeds.

If the charger and/or other USB device is not connected to the receptacle interface 110, in S9055, one or more of the other pins, excluding the CC1 signal pin and the CC2 signal pin, among the plurality of pins installed in the receptacle interface 110 of the USB host 100 pull up in order to determine whether or not water 400 and/or other foreign substance is applied to the receptacle interface 110 of the USB host 100.

Then, in S9056, the change in voltage level of the SBU1 signal pin and the SBU2 signal pin is detected based on the pulled up third current. For example, when the voltage level of the signal outputted to the SBU1 signal pin and the SBU2 signal pin transitions from a first voltage level H to a second voltage level L instead of through pull-down resistances, such as Rd7 and Rd8 of the USB device 300, it may be determined that water 400 and/or other foreign substance is detected from the receptacle interface 110 Of the USB host 100.

When it is determined that water 400 and/or other foreign substance is detected, returning to S9051, the detection of water 400 and/or other foreign substance is performed again, continuously or periodically. Otherwise, the method proceeds to S907 of FIG. 9.

According to various example embodiments of the present disclosure, with respect to the USB type-C® receptacle interface and/or other wired data communication interfaces, it is possible to effectively reduce and/or prevent the corrosion of the pins installed in the receptacle due to the application of foreign matter, particularly, water.

It should be understood that example embodiments described herein should be considered in a descriptive sense only and not for purposes of limitation. Descriptions of features or aspects within each device or method according to example embodiments should typically be considered as available for other similar features or aspects in other devices or methods according to example embodiments. While some example embodiments have been particularly shown and described, it will be understood by one of ordinary skill in the art that variations in form and detail may be made therein without departing from the spirit and scope of the claims.

What is claimed is:

1. A USB (Universal Serial Bus) host comprising:
a plurality of signal pins comprising a CC1 signal pin, a CC2 signal pin, and other pins,
wherein the USB host is configured to,
operate in a protection mode,
detect voltage levels of the plurality of signal pins,
detect a foreign substance when the voltage levels of at least two pins of the other pins are transitioned, and
operate in a normal mode when the foreign substance is not detected and the voltage level of the CC1 signal pin or the CC2 signal pin is transitioned.

2. The USB host of claim 1, wherein the other pins comprise at least one of a TX1+ signal pin, a TX1− signal pin, an RX1+ signal pin, an RX1− signal pin, a TX2+ signal pin, a TX2− signal pin, an RX2+ signal pin, an RX2− signal pin, a D+ signal pin, a D− signal pin, an SBU1 signal pin, an SBU2 signal pin, and an MID(RID) pin.

3. The USB host of claim 1, wherein the USB host is further configured to:
provide a first current to the CC1 signal pin or the CC2 signal pin while in the protection mode; and
provide a second current to the CC1 signal pin or the CC2 signal pin while in the normal mode, the second current being greater than the first current.

4. The USB host of claim 3, wherein the first current is more than 0 uA and less than 80 uA, ±20%.

5. The USB host of claim 4, wherein the first current is about 1 uA.

6. The USB host of claim 1, wherein the operating in the normal mode includes performing at least one operation of a DFP (Downstream Facing Port), a UFP (Upstream Facing Port), and a DRP (Dual-Role Port) according to a USB type-C specification.

7. The USB host of claim 6, wherein the USB host is further configured to:
detect whether or not a USB device is connected; and
turn on a $V_{bus}$ signal pin.

8. The USB host of claim 1, wherein a first current and a second current are pulled up currents.

9. A USB (Universal Serial Bus) host comprising:
a receptacle interface,
wherein the receptacle interface comprises a plurality of signal pins, the plurality of signal pins including a CC1 signal pin, a CC2 signal pin, a $V_{BUS}$ signal pin, and other signal pins,
the receptacle interface is configured to,
provide a first pull up current to the other signal pins,
detect first voltage levels of at least two pins of the other signal pins,
detect water or foreign substance when the first voltage levels are transitioned, and
provide a second pull up current to the CC1 signal pin or the CC2 signal pin when the water or the foreign substance are not detected.

10. The USB host of claim 9, wherein the USB host is further configured to:
perform at least one operation of a DFP (Downstream Facing Port), a UFP (Upstream Facing Port), and a DRP (Dual-Role Port), when second voltage levels of the CC1 signal pin and the CC2 signal pin are transitioned.

11. The USB host of claim 10, wherein the USB host is further configured to:
detect whether or not a USB device is connected; and
turn on the $V_{BUS}$us signal pin.

12. The USB host of claim 11, wherein when the receptacle interface detects the water or the foreign substance, the receptacle interface is configured to:
delay turning on the $V_{BUS}$ signal pin; and
repeat the detection of the water or the foreign substance until the water or the foreign substance is no longer detected.

13. The USB host of claim 9, wherein the second pull up current is greater than the first pull up current.

14. The USB host of claim 13, wherein the first pull up current is more than 0 uA and less than 80 uA, ±20%.

15. The USB host of claim 9, wherein the other pins comprise a TX1+ signal pin, a TX1− signal pin, an RX1+ signal pin, an RX1− signal pin, a TX2+ signal pin, a TX2− signal pin, an RX2+ signal pin, an RX2− signal pin, a D+ signal pin, a D− signal pin, an SBU1 signal pin, an SBU2 signal pin, and an MID(RID) pin.

16. The USB host of claim 9, wherein the receptacle interface is configured to detect the water or the foreign substance when the first voltage levels are transitioned from a high voltage level to a low voltage level.

17. A USB (Universal Serial Bus) system comprising:
a USB host configured to have a plurality of signal pins, the plurality of signal pins including a CC1 signal pin, a CC2 signal pin, and other signal pins; and
a USB device configured to be connected to the USB host directly or connected via a USB cable,
wherein the USB host is configured to:
provide a first pull up current to the CC1 signal pin or the CC2 signal pin,
detect whether or not the USB device is connected based on a first voltage level transition of the CC1 signal pin or the CC2 signal pin,
provide a second pull up current to the CC1 signal pin or the CC2 signal pin when the USB device is connected, and
perform a normal operation based on a second voltage level transition of the CC1 signal pin or the CC2 signal pin,
provide a third pull up current to al least two pairs of the serial pins before providing the first pull up current; and
detect whether a foreign substance is applied to the plurality of signal pins based on whether third voltage levels of the at least two pins of the other signal pins have transitioned from a high level to a low level.

18. The USB system of claim 17, wherein the the normal operation includes performing at least one operation of a DFP (Downstream Facing Port), a UFP (Upstream Facing Port), and a DRP (Dual-Role Port), when the second voltage levels of the CC1 signal pin or the CC2 signal pin are transitioned.

19. The USB system of claim 18, wherein the USB host is further configured to supply USB cable bus power to the connected USB device after the normal operation.

20. The USB system of claim 17, wherein the second pull up current is greater than the first pull up current and the third pull up current.

21. The USB system of claim 20, wherein the first pull up current and the third pull up current are more than 0 uA and less than 80 uA, ±20%.

22. The USB system of claim 17, wherein the other pins comprise a TX1+ signal pin, a TX1− signal pin, an RX1+ signal pin, an RX1− signal pin, a TX2+ signal pin, a TX2− signal pin, an RX2+ signal pin, an RX2− signal pin, a D+ signal pin, a D− signal pin, an SBU1 signal pin, an SBU2 signal pin, a $V_{BUS}$ signal pin, and an MID(RID) pin.

* * * * *